United States Patent Office 3,064,119
Patented Nov. 13, 1962

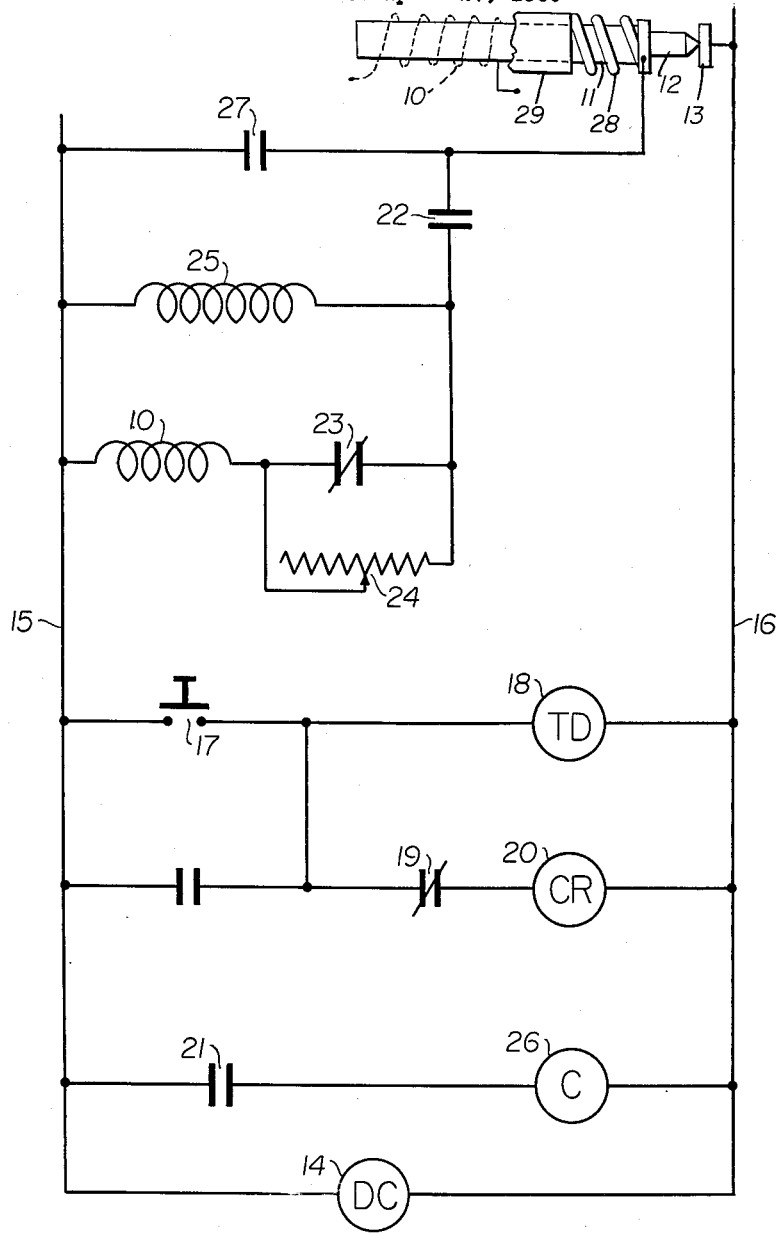

3,064,119
SHORT CYCLE WELDING CIRCUIT
Paul A. Glorioso, Amherst, Ohio, assignor to Gregory Industries, Inc., Toledo, Ohio, a corporation of Michigan
Filed Apr. 27, 1960, Ser. No. 24,936
8 Claims. (Cl. 219—98)

This invention relates to the art of arc welding in general, and relates more specifically to a machine controlled and timed drawn arc melting component parts to form weld metal without additional weld rod.

Mechanical drawn-arc welding, known colloquially as "stud welding," differs from hand-arc welding in that the arc creation and length are controlled mechanically and timed by a mechanism associated with the circuitry or in the circuitry. Usually the apparatus is adapted to place a piece that is to be welded against the member to which it is to be welded and then apply a current of limited value through the touching pieces. The voltage is maintained high, but with a low amperage the welding power is below that which is essential to draw a full welding power arc when the parts were separated. Then, the parts are separated. This separation generally takes place by mechanical apparatus operated by electrical power devices in the general circuitry of the apparatus. The electro-mechanical apparatus is adapted to lift the member to be welded a specific limited distance from the spot where it is to be welded, and in the process causes low value arc to be drawn between the members by reason of the low-value current that has been flowing between the pieces. This arc is employed as a pilot arc. After the parts are separated, a high-intensity welding arc is applied between the two members being welded, and this high-intensity arc will follow the pilot arc previously drawn and begin melting the metal between the two members; the timing system incorporated is employed to bring the pieces back together and hold them in a fixed relationship until the molten metal created by the welding arc is permitted to solidify. According to the particular apparatus employed, the welding power may be discontinued before the members are plunged together, or may be allowed to continue until some period of time after they have come into contact. The former condition produces a welding act termed a "cold plunge," whereas continuing the power produces a "hot plunge."

Another type of apparatus which has been employed for melting portions of two members, wherever at least one of those members is of light gauge and hence not susceptible to deep melting, is to employ a condenser as a power source. Such a condenser system will release a predetermined amount of welding energy whenever the members to be welded are connected on opposite poles of the condenser and brought together to cause the condensers to discharge between the members. It is quite common to provide some type of small tip on one of the members to act as a means for causing the discharge of the condensers to take place in advance of a position where the larger surfaces of the weldable bodies would cause an arc, and to cause the arc to form at the proper center location with respect to the members. In this type of apparatus the members are usually advanced toward one another at a given rate of speed and the tip determines the distance, and hence the time, of the arc before the members come in contact. Thus, it will be seen that correlating the length of the projecting member and the speed of advancing of the two weldable members together will very definitely establish the period of time up to the maximum available time of the condensers, during which a welding arc can burn. Therefore, the welding arc can be of very short and extremely high intensity. By this means, a flash melting of the two weldable surfaces is created to cause a weld without penetrating deeply into the members being welded. This system is ideal for attaching pins to very thin-gauge sheet metal, such for example, as pins to support insulation material on the surface of sheet metal air conditioning duct work.

In herently, in the drawn-arc type of apparatus, because the arc is generally started to operate while the stud is in a fixed position spaced relative to the work against which it is to be welded, the period of time is considerably longer than the condenser-discharge method. Hence, the drawn-arc method and apparatus is generally not useful for welding of studs or similar members to sheet metal surfaces.

It is the object of this invention to provide a circuitry to be associated with a drawn-arc type of welding apparatus and employing a conventional welding generator power source, such as a direct current generator or storage battery, and to produce a welding arc of intense nature for a short period of time, and thereby produce a flash melting of the weldable surfaces comparable to that produced by the condenser-discharge method.

Other objects and a fuller understanding of the invention may be had by referring to the following description and claims taken in conjunction with the accompanying drawing, in which:

The single FIGURE of the drawing is a schematic wiring diagram useful with a solenoid-operated welding gun.

Because such tools employed for stud welding are old and well known, no attempt has been made in the drawing to illustrate the specific mechanical and structural formation of such a tool. Such tools are generally constructed in a housing which guides a solenoid. The solenoid coil and a longitudinally reciprocable iron core member responsive to the coil, are mounted within the housing to draw a suitable chuck member in which the welding piece is held by friction. In the drawing illustrating the circuit, the coil of the solenoid within the gun is represented by the coil symbol 10. A workpiece is represented by the symbol for a stud indicated by the reference character 12. A sheet metal member, to which the stud 12 is to be welded, is indicated by reference character 13. When the gun coil 10 is activated by a proper voltage applied across the coil, it will cause a work holding chuck 11 with which it is associated to draw the stud 12 away from the member 13.

Not all of the circuitry represented in the drawing is contained within the housing of the gun, but rather the bulk of the circuitry is contained in a control box which is allowed to sit in a suitable area near the position where work is to take place, and only the necessary lead wires to the actual portable welding gun are employed. Nevertheless, the drawing sets forth the complete integrated circuit.

A source of power 14, which may be either a generator or a battery power source supplies two sides of a circuit 15 and 16.

The operator's control gun button, indicated by the electrical symbol 17, initiates the operation by closing a circuitry to a time-delay relay 18 and simultaneously supplying current through a normally-closed switch 19 which is operated by the time-delay relay 18. Current passing through the switch 19 then energizes a contact relay 20.

The welding sequence, caused by the high-intensity welding arc, is not controlled through any timing device, but rather is controlled by electrical relationships. However, the time-delay relay 18 is a means for ending the holding action of certain of the components after the weld has taken place. Time-delay relay 18 is a commercially available timing device, usully controlled by an air bleed, and begins a timing cycle whenever energized by closing of the gun button 17.

However, current passing through the button 17 and the normally closed switch 19, energizes a contact relay 20, as previously stated. The relay 20 in turn mechanically operates a contact relay switch 21 and a contact relay switch 22. Although switches 21 and 22 are closed simultaneously, their effect is sequential. Attention will be directed to the first sequential result.

The gun coil 10 (also shown in phantom around the work holding chuck 11) is connected through a normally closed switch 23 and through the contact switch 22 to a circuit connected to the stud 12 through its holding device. Thus, if the stud 12 is in contact with the sheet metal member 13, a current will begin to flow through the gun coil 10 and the coil will exert a lifting force to draw the stud 12 away from the member 13. A spring 28, which is common in such stud welding tools, resists the lifting movement of the gun coil and tends to force the stud 12 toward the member 13. The spring 28 surrounds the work holding chuck 11 between the stud 12 and a portion of the gun housing schematically represented in the drawing and indicated by the reference character 29. Hence, the coil 10 must have sufficient power to overcome the spring action, and whenever the solenoid coil 10 loses the amount of power necessary to hold the spring, the spring will return the stud 12 to the member 13. It is essential in a full understanding of the operation of such tools, to recognize the fact that a solenoid requires a considerably greater amount of energy to pull an iron core member toward itself than is required to hold that iron core member after it has reached a physical contact condition.

A variable resistance device 24 is employed to shunt the switch 23 and thereby provide a selective means to determine the period of time that the gun coil can maintain the iron core lifting device against the force of the spring 28 after the switch 23 has been opened. As soon as the switch 23 opens, the field in the coil 10 begins to collapse. The time necessary for this field to collapse down to the level where the spring can overcome the holding force of the coil will determine the period of time that the stud 12 remains lifted from the member 13 after the switch 23 is opened. Hence, variation of the resistance 24 provides a very accurate selection of this holding time.

Also, a pilot arc choke 25 is connected from the side 15 of the power circuit through the switch 22 and through the stud 12 to the member 13. This choke will permit a relatively low current to flow through the stud 12 to the member 13. Hence, the result of closing the switch 22 is to energize the gun coil 10 and lift the stud 12 away from the member 13 creating a pilot arc. In most instances, there will be sufficient current flow through the gun coil to supply all the pilot power that is necessary. However, in those designs wherein the gun coil is such that a proper pilot arc may not develop, then it is desirable to apply the pilot arc choke 25 to assure a positive pilot arc. The pilot arc thus created will not be of sufficient energy to cause a melting of either the stud or the member 13. Thus, the first result of energizing contact relay 20 is to cause the stud 12 to lift away from the member 13 to the predetermined distance which is established mechanically by the apparatus itself, and to establish a pilot arc between the members.

The switch 21 having closed simultaneously with the switch 22, will energize a contactor coil 26 while the lifting and pilot arc establishment is taking place. This coil 26 is employed to produce a mechanical drive which operates a main contact 27 which closes a direct heavy-gauge welding-cable circuit between the circuit side 15 and the stud 12. The low resistance circuit thus established will create a direct welding circuit between the circuit sides 15 and 16 through the pilot arc between the stud 12 and the member 13. Thus, the welding cycle is established by closing of the main contactor 27.

However, the switch 23 in the circuit to the gun coil 10 is operated by the main contactor coil 26 to open that switch simultaneously with closing of the main contactor 27. In actual practice, the switch 23 is mechanically connected to the contactor switch 27 and the physical movement of the closing of the switch 27 causes opening of the switch 23. With the opening of the switch 23, the gun coil 10 will establish the previously discussed level of flux energy above the point of the necessary amount to hold the stud lifted against the energy of the plunging spring 28.

However, closing of the switch 27 establishes a direct circuit which shunts the circuits of the gun coil 10 and the pilot arc choke 25. Establishment of this direct shunt circuit reduces the amount of current which will flow through the gun coil 10 and choke 25 to such a degree that the two coils 10 and 25 may be considered to be deactivated completely. They will not draw sufficient current to be operative. Nevertheless, the gun coil 10 has a certain amount of energy which must be dissipated before it will release the spring. Hence, the gun coil 10 will not release the spring instantaneously, but will keep this spring retention until the magnetic flux does collapse to the point where the spring will overcome the holding energy of the solenoid. This time is measured in milliseconds and is variable by setting of the resistance 24 according to the size of the workpieces involved. Generally, setting of the variable resistance 24 will be accomplished by trial and error until the optimum weld conditions are established for particular working conditions.

As soon as the gun coil energy is dissipated to the condition where the spring 28 may cause the stud 12 to return to the plate 13, such action will take place and will then cause a direct dead short across the circuit sides 15 and 16. The hot plunger which is caused by a continuation of the welding arc until the members 12 and 13 are directly in contact, assures a fluid condition of the members, and continuation of the current thereafter will be of a resistance weld nature which will aid the formation of a good weld, but will not cause the burning caused by continuation of an arc.

In the condition thus far described; namely, with the stud against the workpiece and current continuing to flow, the operation must be brought to an end. This is the purpose of the time-delay relay 18. The time-delay 18 is set to time out at a period longer than necessary to complete the previously described operation. When it reaches the end of its time period, the time-delay 18 will cause the time-delay switch 19 to open and thus de-energize contact relay 20. When the contact relay 20 is de-energized, it in turn will open the switches 21 and 22, thus de-energizing the coil of the contactor 26 and opening the contact 27.

*Summary*

The tip design of the condenser type of light gauge stud welding is quite expensive to manufacture and very close tolerances must be held in order for it to operate consistently. This apparatus of the present invention is a novel arrangement which produces an exceedingly short period of time and has made possible the welding of studs having no particular end formation. The illustrated and described circuitry is the result of the discovery that light gauge welding is dependent upon a high level of welding energy for an exceedingly short period of time. Actually, this light gauge welding process is practically identical to the presently employed heavy gauge drawn arc stud welding process in the employment of the lift-pilot-arc-weld-power cycle with the only real difference being that a much shorter weld time has been established by the novel circuitry disclosed.

After the concept of the essence of light gauge welding was comprehended; namely, the very short high-intensity period, and the described circuitry was created to enable the accurate timing consistently, the apparatus was employed with a variety of different types of stud ends to determine whether the end configuration of the stud could be employed to improve the weld. Happily, it has been found that after trying various types of pointed and tipped ends, the use of a substantially flat-end stud is superior to most efforts to produce a tipped or pointed end. Thus, the cost of the studs to be attached to a light gauge metal surface is materially reduced from previous cost necessary for condenser discharge systems.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. An electrical circuit suitable for welding a stud to a base, said electrical circuit comprising first and second circuits, said first circuit including a lifting coil and means to selectively control current flow in the lifting coil, the second circuit being a welding circuit in parallel with the first circuit, a single electric current source connectable to the electrical circuit to energize said electrical circuit, control means to energize said first circuit prior to said second circuit when the electrical circuit is connected to the energizing means, when energized said first circuit having less current than required to produce a weld, when energized said second circuit having sufficient current to produce a weld, and means to de-energize the two circuits, whereby when the first circuit is energized a stud is lifted by the solenoid action of the lifting coil and a non-welding arc drawn between a stud and the piece to which it is to be welded and thereafter a welding current applied through the second circuit shunting said first circuit causing a current drop in said first circuit from a preselected amount.

2. In the circuit of claim 1 said means to control the current flow in the coil being a resistance in series with the coil.

3. In the circuit of claim 1 said means to control the current flow in the coil being a variable resistance.

4. An electrical circuit suitable for welding a stud to a base, said electrical circuit comprising first and second circuits, said first circuit including a lifting coil with a resistance in series therewith and a pilot arc coil in parallel with said lifting coil and said resistance, the second circuit being a welding circuit in parallel with the first circuit, single electric energizing means connectable to the electric circuit, control means to energize said first circuit prior to said second circuit, when energized said first circuit having less current than required to produce a weld, when energized said second circuit having sufficient current to cause a weld, and means to de-energize said first and second circuits.

5. In the circuit of claim 4 said resistance being a variable resistance.

6. An electric circuit suitable for welding a stud to a base, said electrical circuit comprising first and second circuits, said first circuit including coil means for lifting a stud to be welded a predetermined distance from a base to which it is to be welded and to establish an arc of a current less than welding current between the stud and the piece, said coil means including means to control the maximum current applied to said coil, the second circuit being a welding circuit capable of carrying current sufficient to produce a weld, said second circuit being in parallel with said first circuit, a stud to be welded common to and in series with both said first and second circuits, a single electrical energy source connectable to said electrical circuit, control means to energize said first circuit prior to energizing said second circuit, and to de-energize both circuits, and spring means electrically insulated from the electrical circuit urging the stud toward the base to which it is to be welded, whereby when the first circuit is energized a stud is lifted by the solenoid action of the lifting coil and a non-welding arc drawn between a stud and the piece to which it is to be welded and thereafter a welding current applied through the second circuit shunting said first circuit causing a current drop in said first circuit from a preselected amount.

7. An electric circuit suitable for welding a stud to a base, said electrical circuit comprising first and second circuits and a control circut, said first circuit including a lifting coil, a variable resistance in series with said lifting coil, a first relay switch in series with said lifting coil and in parallel with said variable resistance, a pilot arc coil in parallel with the lifting coil and said variable resistance and said first relay switch, a second relay switch electrically separating said first circuit from said second circuit when said second relay switch is in an open position, said second circuit being the welding circuit and capable of carrying sufficient current to produce a weld, said second circuit including a third relay switch, a single electrical source connectable to said control circuit, said control circuit electrically connectable to said first and second circuits, said control circuit including an energizing switch and a time delay control in series with each other, a fourth relay switch in parallel with said energizing switch and in series with said time delay control, a time delay switch and a first relay control in series with each other and in series with said fourth relay and said energizing switch, and in parallel with said time delay control, a fifth relay switch and second relay control in series with each other and in parallel with the rest of the control circuit, said first relay control operably connected to said second relay switch, said fourth relay switch, and to said fifth relay switch, said second relay control operably connected to said first relay switch and said third relay switch, said time delay control being in operative control with said time delay switch, said third relay switch being a slower acting switch than any other relay switch, when the electrical circuit is not energized said first relay switch being closed and all the other relay switches being open, a stud holder device carried by said lifting coil to hold a stud to be welded in series with both first and second circuits, and a spring to urge the stud toward a base to which it is to be welded.

8. A welding apparatus capable of producing a drawn arc weld of short duration comprising, a chuck to hold a stud, means to position said chuck in relationship to a workpiece, an electrically actuated lift device capable of drawing said chuck away from said workpiece a predetermined distance when electrically excited, and to return said chuck when deactivated, an electrical circuit directing a current of a predetermined voltage and amperage less than welding value to said chuck and stud held thereby, electrical shunt circuit means to shunt said arc circuit, said shunt circuit arranged to deliver a full welding current to said chuck and stud from the same source as the arc circuit, and means for causing said lift device to be electrically activated and deactivated with the activation and deactivation of said first named electrical circuit.

References Cited in the file of this patent

UNITED STATES PATENTS 2,648,748    Sayer _____ Aug. 11, 1953